(12) United States Patent
Fukui et al.

(10) Patent No.: US 7,238,955 B2
(45) Date of Patent: Jul. 3, 2007

(54) RADIATION IMAGE STORAGE PANEL

(75) Inventors: Shinichiro Fukui, Kanagawa (JP); Hiroki Saito, Kanagawa (JP); Hirokazu Misawa, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 110 days.

(21) Appl. No.: 11/238,988

(22) Filed: Sep. 30, 2005

(65) Prior Publication Data
US 2006/0065852 A1    Mar. 30, 2006

(30) Foreign Application Priority Data
Sep. 30, 2004    (JP)    ............... 2004-288266

(51) Int. Cl.
*G03B 42/08* (2006.01)
(52) U.S. Cl. .................................. 250/484.4
(58) Field of Classification Search ............. 250/484.4
See application file for complete search history.

(56) References Cited

U.S. PATENT DOCUMENTS 4,782,237 A * 11/1988 Teraoka et al. .......... 250/486.1

* cited by examiner

*Primary Examiner*—Constantine Hannaher
*Assistant Examiner*—Mindy Vu
(74) *Attorney, Agent, or Firm*—Sughrue Mion, PLLC

(57) ABSTRACT

In a radiation image storage panel which has a phosphor layer containing energy-storing phosphor particles, the energy-storing phosphor particles is composed of a mixture of a phosphor particle group having a relatively large median diameter and a phosphor particle group having a relatively small median diameter, the former group having a median diameter of 4 to 30 μm, the latter group having a median diameter of 1 to 8 μm, and the mixture having a particle size frequency distribution that satisfies the condition of:

$$(x+y)/5 > z$$

in which x is a size frequency (%) at the peak in a larger range of the size frequency distribution curve, y is a size frequency (%) at the peak in a smaller range, and z is the lowest size frequency (%) in the range between the two peaks.

4 Claims, 3 Drawing Sheets

RADIATION IMAGE STORAGE PANEL

FIELD OF THE INVENTION

The present invention relates to a radiation image storage panel employable in a radiation image recording and reproducing method utilizing an energy-storing phosphor.

BACKGROUND OF THE INVENTION

When the energy-storing phosphor (e.g., stimulable phosphor, which gives off stimulated emission) is exposed to radiation such as X-rays, it absorbs and stores a portion of the radiation energy. The phosphor then emits stimulated emission according to the level of the stored energy when it is exposed to electromagnetic wave such as visible or infrared light (i.e., stimulating light). A radiation image recording and reproducing method utilizing the energy-storing phosphor has been widely employed in practice. In that method, a radiation image storage panel, which is a sheet comprising the energy-storing phosphor, is used. The method comprises the steps of: exposing the storage panel to radiation having passed through an object or having radiated from an object, so that radiation image information of the object is temporarily recorded in the storage panel; sequentially scanning the storage panel with the stimulating light such as a laser beam to emit a stimulated light; and photoelectrically detecting the emitted light to obtain electric image signals. The storage panel thus treated is subjected to a step for erasing radiation energy remaining therein, and then stored for the use in the next recording and reproducing procedure. Thus, the radiation image storage panel can be repeatedly used.

The radiation image storage panel (often referred to as energy-storing phosphor sheet) has a basic structure comprising a support and a phosphor layer provided thereon. However, if the phosphor layer is self-supporting, the support may be omitted. Further, a protective layer is generally provided on the free surface (surface not facing the support) of the phosphor layer so as to keep the phosphor layer from chemical deterioration or physical damage.

Various kinds of energy-storing phosphor layers are known. For example, the phosphor layer can comprise a binder and energy-storing phosphor particles dispersed therein, or otherwise can comprise agglomerate of an energy-storing phosphor without binder. The latter layer can be formed by a gas phase-accumulation method or by a firing method.

The radiation image recording and reproducing method (or radiation image forming method) has various advantages as described above. However, it is still desired that the radiation image storage panel used in the method have as high sensitivity as possible and, at the same time, give a reproduced radiation image of as high quality (in regard to sharpness and graininess) as possible.

JP-B-4-75480 discloses a radiation image storage panel which comprises a phosphor layer containing a mixture of two groups of stimulable phosphor particles having the same chemical composition but having different sizes. The group of smaller particles has a size distribution in which the peak is positioned in the range of 1 to 8 μm, and the group of larger particles has a size distribution in which the peak is positioned in the range of 4 to 30 μm. The space between those peaks is at least 2 μm. In the mixture, the ratio by weight between the smaller particles and the larger particles is in the range of 20:80 to 90:10.

JP-A-9-269400 discloses a radiation image storage panel comprising a phosphor layer in which the packing degree of phosphor particles is 65% or more. The phosphor layer contains a mixture of smaller phosphor particles and larger phosphor particles. The smaller particles have a size distribution in which the peak (A) is positioned in the range of 0.5 to 5 μm, and the larger particles have a size distribution in which the peak (B) is positioned in the range of 6 to 30 μm. The ratio by weight between the smaller particles and the larger particles is in the range of 5:95 to 40:60. The particles of the peak B are larger than the particles of the peak A by 5 μm or more, or otherwise are three times or more as large as the particles of the peak A.

JP-A-2004-137359 discloses a process for preparation of a rare earth activated alkaline earth metal fluoride halide stimulable phosphor. The disclosed process comprises a step of classification using a curved pneumatic conveying classifier. In the publication, however, the treated phosphor is in the form of uniform particles.

For the purpose of improving the sensitivity and the image quality, it is known, as disclosed in the above-mentioned publications, that the phosphor layer is made to contain two groups of phosphor particles having different sizes. That is because large and small particles can be densely packed to improve the packing density of phosphor in the phosphor layer. However, if the larger particles are too large, the image quality such as sharpness is lowered and the size distribution is liable to widen out. On the other hand, if the smaller particles are too small, they often agglomerate and the amount of emission decreases to give poor emission properties. Accordingly, it is desired to produce a phosphor layer in which phosphor particles giving preferred properties are so densely packed that the image quality such as graininess can be improved without impairing the sensitivity.

SUMMARY OF THE INVENTION

It is an object of the present invention to provide a radiation image storage panel giving a radiation image of high quality.

The applicant has studied the above-mentioned problem, and finally found that the packing density of phosphor particles in the phosphor layer can be further improved if the phosphor particles are obtained by preparing two groups of phosphor particle having preferred sizes and then by classifying the particles of each group so that each group may have a proper size frequency distribution.

The present invention resides in a radiation image storage panel which has a phosphor layer containing energy-storing phosphor particles, wherein the energy-storing phosphor particles comprises a mixture of a phosphor particle group having a relatively large median diameter and a phosphor particle group having a relatively small median diameter, the former group having a median diameter in the range of 4 to 30 μm, the latter group having a median diameter in the range of 1 to 8 μm, and the mixture of these groups having a particle size frequency distribution that satisfies the condition of:

$$(x+y)/5 > z$$

in which x is a size frequency in terms of percent at the peak in a larger range of the size frequency distribution curve, y is a size frequency in terms of percent at the peak in a smaller range, and z is the lowest size frequency in terms of percent in the range between the two peaks.

The radiation image storage panel of the invention, which comprises phosphor particles having preferred sizes and a proper size frequency distribution, has a phosphor layer in which the phosphor particles are packed densely enough to give a radiation image excellent in image quality such as graininess. Even if the storage panel is exposed to radiation in a small dose (namely, even in an imaging area of low exposure), it can give a reproduced radiation image of high quality. Accordingly, the radiation image storage panel of the invention can be favorably used for medical diagnoses according to computed radiography.

DETAILED DESCRIPTION OF THE INVENTION

In the present invention, the particle size frequency distribution of the energy-storing phosphor particles preferably satisfies the condition of:

$$(x+y)/7>z \quad (II)$$

in which x, y and z are the same as those defined above.

The phosphor particle group having a relatively large median diameter (hereinafter, often referred to as "large particle group" or "larger group") preferably has a median diameter in the range of 6 to 15 μm, and the phosphor particle group having a relatively small median diameter (hereinafter, often referred to as "small particle group" or "smaller group") preferably has a median diameter in the range of 2 to 4 μm.

The phosphor layer preferably has a thickness in the range of 300 to 500 μm.

In the following description, the radiation image storage panel of the invention is explained in more detail with reference to the attached drawings.

Figure 1:
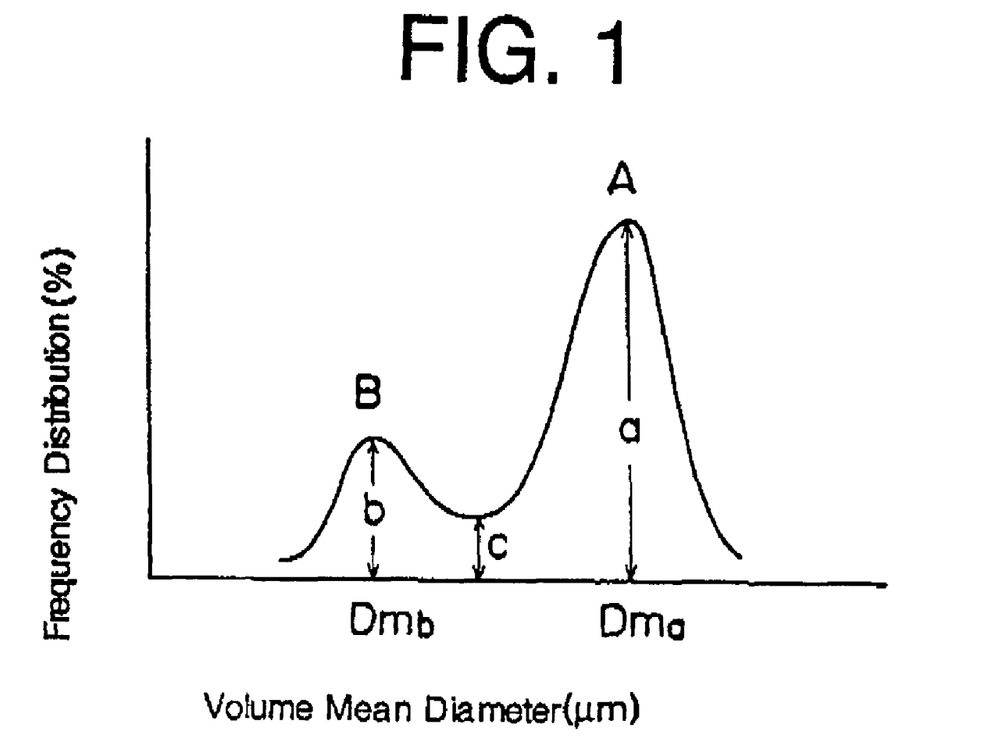
FIG. 1 is a graph schematically illustrating a size frequency distribution of energy-storing phosphor particles according to the invention.

FIG. 1 is a graph schematically illustrating a size frequency distribution of energy-storing phosphor particles according to the invention. In the graph of FIG. 1, the volume mean diameters (μm) of phosphor particles are plotted on the horizontal axis (in logarithmic scale) while the frequencies (%) are plotted on the vertical axis.

In the invention, the size frequency distribution of phosphor particles is determined in the following manner. First, a phosphor layer is separated from the storage panel, and heated at 500° C. to burn off materials other than the phosphor. The remaining phosphor is added into an electrolytic solution (methanol containing lithium chloride dissolved therein), and fully dispersed for 1 minute in an ultrasonic cleaner. The phosphor particles dispersed in the solution are then counted by means of a Coulter counter, to obtain the size frequency distribution. Each size class of the size frequency distribution is determined so that the range of the class may be 1.2 times as large as that of the neighboring smaller class and thereby so that the range of each class may have the same width in logarithmic scale.

In the invention, the energy-storing phosphor particles are preferably composed of two particle groups. One is a large phosphor particle group A (median diameter: $Dm_a$) and the other is a small phosphor particle group B (median diameter: $Dm_b$). The median diameter $Dm_a$ of the large particle group is in the range of 4 to 30 μm, preferably in the range of 6 to 15 μm. The median diameter $Dm_b$ of the small particle group is in the range of 1 to 8 μm, preferably in the range of 2 to 4 μm. In this specification, the term "median diameter" means a diameter at which the accumulated distribution reaches 50% of the total particles in the distribution curve (diameter versus frequency) of each group (namely, a diameter positioned at the median of each particle size distribution).

The phosphor particles used in the invention are composed of the phosphor particle groups A and B, and have a size distribution shown in FIG. 1. The distribution curve in FIG. 1 has two local maximum size frequencies (peaks or shoulders) x and y at the median diameters $Dm_a$ and $Dm_b$, respectively. In the distribution curve, the local minimum size frequency (lowest size frequency) z is positioned between $Dm_a$ and $Dm_b$. The present invention is characterized in that the size frequencies x, y and z satisfy the condition of the following formula (I):

$$(x+y)/5>z \quad (I).$$

They preferably satisfy the condition of the following formula (II):

$$(a+b)/7>c \quad (II).$$

In the invention, in order to improve the packing density of phosphor in the phosphor layer, the sizes and size distribution of the phosphor particles are controlled so that the lowest size frequency z satisfying the formula (I) (preferably, the formula (II)) may be positioned in the range between the maximum size frequency x of the larger group A (median diameter: $Dm_a$) and the maximum size frequency y of the smaller group B (median diameter: $Dm_b$). In other words, the packing density is increased by decreasing the number of phosphor particles having diameters between the median diameters $Dm_a$ and $Dm_b$.

For obtaining the two groups of phosphor particles having the aforementioned sizes and size distributions, particles of each group are made to have as uniform sizes as possible. For example, the phosphor is prepared so that the phosphor particles can be mono-dispersively formed. The prepared phosphor particles may be subjected to suitable classification.

Figure 2:
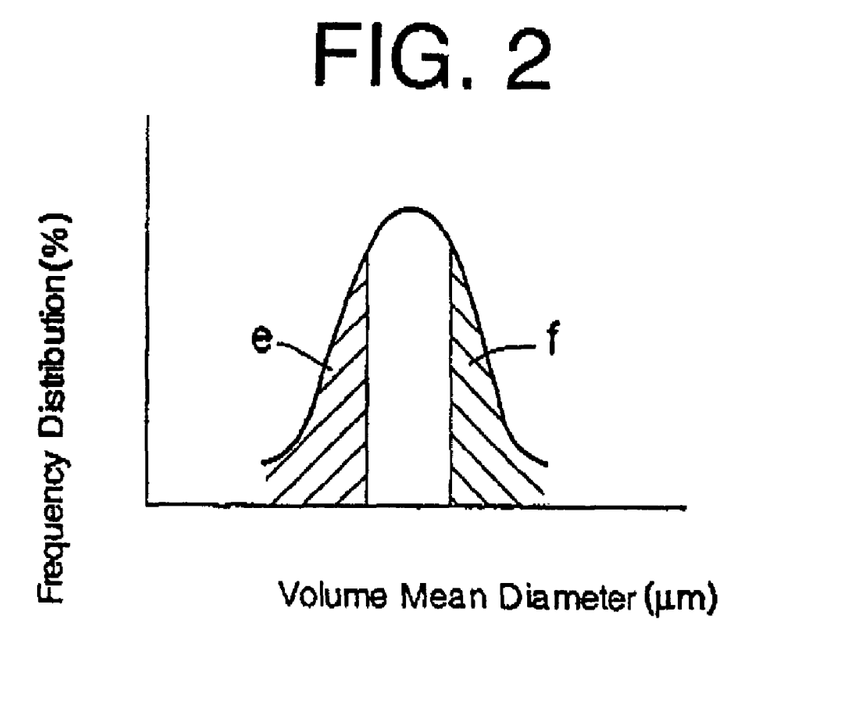
FIG. 2 is a graph schematically illustrating a size frequency distribution of uniform energy-storing phosphor particles.

FIG. 2 is a graph schematically illustrating a size frequency distribution of uniform energy-storing phosphor particles. For preparing a particle group having the desired size distribution, small particles (particles in the hatched area e in FIG. 2) in the large particle group, large particles (particles in the hatched area f in FIG. 2) in the small particle group, or small and large particles (particles in the hatched areas e and f in FIG. 2) in the large particle group are removed by classification. These may be optionally combined. The classification can be carried out, for example, by sieving, by pneumatic separating or by centrifuging. The pneumatic classification is particularly preferred.

The energy-storing phosphor is preferably a stimulable phosphor giving off stimulated emission in the wavelength region of 300 to 500 nm when exposed to stimulating rays in the wavelength region of 400 to 900 nm. Examples of the stimulable phosphors include europium or cerium activated alkaline earth metal halide stimulable phosphors (e.g., BaF-Br:Eu and BaF(Br,I):Eu) and cerium activated rare earth oxide halide stimulable phosphors.

Particularly preferred is a rare earth activated alkaline earth metal fluoride halide stimulable phosphor represented by the following formula (I):

$$M^{II}FX:zLn \qquad (I)$$

in which $M^{II}$ is at least one alkaline earth metal selected from the group consisting of Ba, Sr and Ca; Ln is at least one rare earth element selected from the group consisting of Ce, Pr, Sm, Eu, Tb, Dy, Ho, Nd, Er, Tm and Yb; X is at least one halogen selected from the group consisting of Cl, Br and I; and z is a number satisfying the condition of $0<z \leq 0.2$.

In the formula (I), $M^{II}$ preferably comprises Ba more than half of the total amount of $M^{II}$, and Ln is preferably Eu or Ce. The $M^{II}FX$ in the formula (I) represents a matrix crystal structure of BaFX type, and hence it by no means indicates stoichiometrical composition of the phosphor though appearing F:X=1:1. It is generally preferred that the BaFX type crystal have many $F^+$ ($X^-$) centers corresponding to vacant lattice points of $X^-$ ions since they increase the efficiency of stimulated emission in the wavelength region of 600 to 700 nm. In that case, F is often slightly in excess of X.

Although omitted from the formula (I), one or more additives such as bA, $wN^I$, $xN^{II}$ and $yN^{III}$ may be incorporated into the phosphor of the formula (I), if needed. In the above, A stands for a metal oxide such as $Al_2O_3$, $SiO_2$ or $ZrO_2$. In order to prevent $M^{II}FX$ particles from sintering, the metal oxide preferably has low reactivity with $M^{II}FX$ and the primary particles of the oxide are preferably super-fine particles of 0.1 μm or less diameter. In the above, $N^I$ is a compound of at least one alkali metal selected from the group consisting of Li, Na, K, Rb and Cs; $N^{II}$ is a compound of alkaline earth metal(s) Mg and/or Be; and $N^{III}$ is a compound of at least one trivalent metal selected from the group consisting of Al, Ga, In, Tl, Sc, Y, La, Gd and Lu. The metal compounds are preferably halides, but are not restricted to them.

In the above, b, w, x and y represent amounts of the additives incorporated into the starting materials, provided that the amount of $M^{II}FX$ is assumed to be 1 mol. They are numbers satisfying the conditions of $0 \leq b \leq 0.5$, $0 \leq w \leq 2$, $0 \leq x \leq 0.3$ and $0 \leq y \leq 0.3$, respectively. These numbers by no means represent the contents in the resultant phosphor because the additives often decrease during the steps of firing and washing performed thereafter. Some additives remain in the resultant phosphor as they are added to the starting materials, but the others react with $M^{II}FX$ or are involved in the matrix.

The phosphor of the formula (II) may further comprise Zn and Cd compounds; metal oxides such as $TiO_2$, BeO, MgO, CaO, SrO, BaO, ZnO, $Y_2O_3$, $La_2O_3$, $In_2O_3$, $GeO_2$, $SnO_2$, $Nb_2O_5$, $Ta_2O_5$ and $ThO_2$; Zr and Sc compounds; B compounds; As and Si compounds; tetrafluoro-borate compounds; hexafluoro compounds such as monovalent or divalent salts of hexafluorosilicic acid, hexafluoro-titanic acid and hexafluorozirconic acid; or compounds of transition metals such as V, Cr, Mn, Fe, Co and Ni. The phosphor usable in the invention is not restricted to the above phosphor containing additives, and any phosphor that can be essentially regarded as rare earth activated alkaline earth metal fluoride halide stimulable phosphor can be used.

The rare earth activated alkaline earth metal fluoride halide stimulable phosphor represented by the formula (I) is normally in the form of particles having aspect ratios of 1.0 to 5.0. The particles of the energy-storing phosphor used in the invention have aspect ratios of preferably 1.0 to 2.0 (more preferably 1.0 to 1.5). In the size distribution of them, the σ/Dm (in which σ represents the standard deviation) is preferably 50% or less (more preferably 40% or less). The shape of the particle is rectangular parallelepiped, regular hexahedron, regular octahedron, tetradecahedron, intermediate polyhedron thereof, or irregular shape. Among them, tetradecahedron is preferred.

The phosphor employable in the invention is not restricted to the above-mentioned stimulable phosphor represented by the formula (I).

The radiation image storage panel of the invention can be produced, for example, in the following manner.

The support generally is a soft resin sheet or film having a thickness of 50 μm to 1 mm. The support may be transparent, may contain light-reflecting material (e.g., particles of alumina, titanium dioxide and barium sulfate) or voids for reflecting the stimulating rays or the emission, or may contain light-absorbing material (carbon black) for absorbing the stimulating rays or the emission. Examples of the resin materials employable for the support include polyethylene terephthalate, polyethylene naphthalate, aramide resin and polyimide resin. For improving the sharpness of the resultant image, fine concaves and convexes may be formed on the phosphor layerside surface of the support (or on the phosphor layerside surface of an auxiliary layer such as an undercoating layer, a light-reflecting layer or a light-absorbing layer, if they are provided). The support may be a sheet of metal, ceramics or glass, if desired.

On the support, the light-reflecting layer comprising particles of light-reflecting material and a binder can be provided. Examples of the light-reflecting material include white pigments such as $Al_2O_3$, $ZrO_2$, $TiO_2$, MgO, $BaSO_4$, $SiO_2$, ZnS, ZnO, $CaCO_3$, $Sb_2O_3$, $Nb_2O_5$, $2PbCO_3 \cdot Pb(OH)_2$, $PbF_2$, $BiF_3$, $Y_2O_3$, YOCl, $M^{II}FX$ (in which $M^{II}$ is at least one selected from the group consisting of Ba, Sr and Ca; and X is at least one selected from the group consisting of Cl and Br), lithopone ($BaSO_4$ and ZnS), magnesium silicate, basic lead silicate sulfate, basic lead phosphate, and aluminum silicate; and hollow polymer. They may be used singly or in combination, Particularly preferred are $Al_2O_3$, $Y_2O_3$, $ZrO_2$ and $TiO_2$, which have high refractive indexes.

The light-reflecting layer reflects the emission given off from the energy-storing phosphor preferably in an amount (reflectance) of 70% or more at the peak wavelength. Further, the light-reflecting layer preferably gives a stimulating light-scattering length of 5 μm or less. Here, the term "stimulating light-scattering length" means an average distance in which the stimulating light travels until once scattered, and hence a short scattering length indicates that the ray is highly scattered. The scattering length can be calculated based on Kubeluka-Munk theory from transmittance of the light-reflecting layer. In order to prepare the light-reflecting layer giving the above scattering length, the mean diameter of the particles of light-reflecting material is preferably ¼ to 2 times as long as the stimulating wavelength. In other words, the mean diameter of the particles is preferably in the range of 0.1 to 2.0 μm because the stimulating light is normally in the wavelength range of 500 to 800 nm.

The BET specific surface area (surface area per unit mass) of the light-reflecting material is generally 1.5 $m^2$/g or more, preferably in the range of 2 to 10 $m^2$/g. The bulk density (mass/volume when packed closest) of the reflecting material is preferably 1 mg/$cm^3$ or less, more preferably 0.6 mg/cm$^3$ or less. The bulk density can be obtained by the steps of: weighing powder of the light-reflecting material to obtain the mass, shaking the powder to fill voids therein so that the powder may be packed closest, measuring the volume of the closest packed powder, and calculating the ratio of the mass to the volume.

The light-reflecting layer can be formed by the steps of: preparing a coating solution in which the fine particles of light-reflecting material and a binder are dissolved or dispersed in an organic solvent, evenly spreading the coating solution to coat the surface of the support, and drying the solution spread on the surface. The weight ratio of the binder to the light-reflecting material in the coating solution is generally in the range of 1/10 to 1/50 (by weight), preferably in the range of 1/10 to 1/20 (by weight). The binder and the organic solvent can be optionally selected from those described later for preparing the coating solution from which the phosphor layer is formed. The coating solution may contain a surface-treatment agent such as an aluminum coupling agent, a titanate coupling agent, or a silane coupling agent so that the light-reflecting material may be well dispersed. The thickness of the light-reflecting layer generally is in the range of 5 to 100 μm.

For increasing the adhesion between the support and the light-reflecting layer, an adhesive layer made of polyester resin or acrylic resin can be provided.

On the support (or on the light-reflecting layer), a phosphor layer comprising particles of energy-storing phosphor is provided. The particles of energy-storing phosphor is composed of a mixture of the large and smell particle groups having the above median diameters and size distributions. In the mixture, the particles of the larger group preferably are in an amount of 50 to 90 wt. %, and the particles of the smaller group preferably are in an amount of 10 to 50 wt. %.

For forming the phosphor layer, the phosphor particles of the larger group and those of the smaller group are mixed, and dispersed or dissolved together with a binder in an appropriate organic solvent to prepare a coating solution. The coating solution is preferably stirred for 1 minute or more at a rotation rate of 20 m/sec. or more, so as to disperse small particles (which are liable to agglomerate) enough to further improve the size frequency distribution. The ratio between the binder and the phosphor in the solution is generally in the range of 1:1 to 1:100 (by weight), preferably 1:10 to 1:50 (by weight).

As the binder dispersing and supporting the phosphor particles, various resin materials are generally known. Examples of the binder include natural polymers such as proteins (e.g., gelatin), polysaccharides (e.g., dextran) and gum arabic; and synthetic polymers such as polyvinyl butyral, polyvinyl acetate, nitrocellulose, ethyl cellulose, vinylidene chloride-vinyl chloride copolymer, polyalkyl (meth)acrylate, vinyl chloride-vinyl acetate copolymer, polyurethane, cellulose acetate butyrate, polyvinyl alcohol, linear polyester, and thermoplastic elastomers. These may be crosslinked with a crosslinking agent.

The coating solution may contain various additives such as a dispersing aid to assist the phosphor particles in dispersing, a plasticizer for enhancing the bonding between the binder and the phosphor particles, an anti-yellowing agent for preventing the layer from undesirable coloring, a hardening agent, and a crosslinking agent.

The prepared coating solution is then evenly spread to coat a surface of the support. The coating procedure can be carried out by a normal means such as a doctor blade, a roll coater or a knife coater. The spread solution is then dried to form the energy-storing phosphor layer. The thickness of the phosphor layer depends on various conditions such as characteristics of the desired storage panel, properties of the phosphor and the mixing ratio between the binder and the phosphor, but is generally in the range of 20 μm to 1 mm, preferably in the range of 50 to 500 μm, more preferably in the range of 300 to 500 μm.

The formed phosphor layer may be compressed by means of, for example, a calender machine. If the phosphor layer is compressed, the phosphor particles can be furthermore closely packed in the phosphor layer.

The energy-storing phosphor layer does not always need to be a single layer, and may consist of two or more sub-layers. In that case, at least one sub-layer contains the aforementioned mixture of small and large phosphor particles. The other sub-layers may have different composition. For example, they may differ in the phosphor in regard to the composition or the particle size, or may differ in the ratio between the phosphor and the binder. In other words, the sub-layers can be optimally designed so that the emission characteristics of the phosphor layer may suit the use of the storage panel or so that suitable scattering or absorption characteristics may be obtained. Further, it is not necessary to form the phosphor layer directly on the support or on the light-reflecting layer. For example, the phosphor layer beforehand formed on another substrate (temporary support) may be peeled off and then fixed on the support or on the light-reflecting layer with an adhesive.

On the energy-storing phosphor layer, a protective layer is preferably provided to ensure good handling of the storage panel in transportation and to avoid deterioration. The protective layer is preferably transparent so as not to prevent the stimulating light from coming in or not to prevent the emission from coming out. Further, for protecting the storage panel from chemical deterioration and physical damage, the protective layer is preferably chemically stable, physically strong, and of high moisture proof.

The protective layer can be provided by coating the phosphor layer with a solution in which a transparent organic polymer (e.g., cellulose derivatives, polymethyl methacrylate, fluororesins soluble in organic solvents) is dissolved in an appropriate solvent, by placing a beforehand prepared sheet as the protective layer (e.g., a film of organic polymer such as polyethylene terephthalate) on the phosphor layer with an adhesive, or by depositing vapor of inorganic compounds on the phosphor layer. Various additives may be contained in the protective layer. Examples of the additives include light-scattering fine particles (e.g., particles of magnesium oxide, zinc oxide, titanium dioxide and alumina), a slipping agent (e.g., powders of perfluoroolefin resin and silicone resin) and a crosslinking agent (e.g., polyiso-cyanate). The thickness of the protective layer is generally in the range of about 0.1 to 20 μm.

For enhancing resistance to stain, a fluororesin layer may be provided on the protective layer. The fluororesin layer can be formed by coating the surface of the protective layer with a solution in which a fluororesin is dissolved (or dispersed) in an organic solvent, and then by drying the applied solution. The fluororesin may be used singly, but a mixture of the fluororesin and a film-forming resin is normally employed. In the mixture, an oligomer having polysiloxane structure or perfluoro-alkyl group can be further added. In the fluororesin layer, fine particle filler may be incorporated to reduce blotches caused by interference and thereby to improve quality of the resultant image. The thickness of the fluororesin layer generally is in the range of 0.5 to 20 μm. For forming the fluororesin layer, additives such as a crosslinking agent, a film-hardening agent and an anti-yellowing agent can be used. In particular, the crosslinking agent is advantageously employed to improve durability of the fluororesin layer.

In the way described above, the radiation image storage panel of the invention can be produced. The storage panel of the invention may be in known various structures. For example, in order to improve the sharpness of the resultant image, at least one of the layers may be colored with a colorant which does not absorb the stimulated emission but the stimulating ray. Further, another phosphor layer comprising a phosphor which absorbs radiation and instantly emits ultraviolet or visible light (namely, a layer of radiation-absorbing phosphor) may be provided. Examples of that phosphor include phosphors of $LnTaO_4$: (Nb, Gd) type, $Ln_2SiO_5$: Ce type, LnOX:Tm type (Ln is a rare earth element) and CsX (X is a halogen) type; $Gd_2O_2S$:Tb; $Gd_2O_2S$:Pr,Ce; $ZnWO_4$; $LuAlO_3$:Ce; $Gd_3Ga_5O_{12}$:Cr,Ce; and $HfO_2$.

EXAMPLE 1

(1) Energy-Storing Phosphor Particles

Groups of large and small $BaF(Br_{0.85}I_{0.15})$:$Eu^{2+}$ stimulable phosphor particles in the shape of tetradecahedron were independently prepared. The particles of the larger group were sieved to remove too large particles, and pneumatically classified to remove remaining too large particles and too small particles. Thus obtained large particle group had a median diameter of 7.93 μm. Then, the particles of the smaller group were sieved to remove too large particles, and pneumatically classified to remove remaining too large particles. Thus obtained small particle group had a median diameter of 2.76 μm.

(2) Preparation of Phosphor Sheet

[Energy-Storing Phosphor]

| | |
|---|---|
| Large particle group (median diameter: 7.93 μm) | 700 g |
| Small particle group (median diameter: 2.76 μm) | 300 g |
| Binder: polyurethane elastomer [methyl ethyl ketone solution (solid content: 13 wt. %) of Pandex T5265H, Dainippon Ink & Chemicals, Inc.] | 182 g |
| Crosslinking agent: polyisocyanate resin [Colonate HX (solid content: 100%), Nippon Polyurethane Co., Ltd.] | 3 g |
| Anti-yellowing agent: epoxy resin [Epikote #1001 (solid), Yuka Shell Epoxy] | 6.7 g |

The above-mentioned materials were added in methyl ethyl ketone (MEK), and mixed and dispersed at a propeller rotation rate of 15 m/sec. for 2 hours by means of a propeller mixer to prepare a coating solution having a viscosity of 3.5 Pa·s (binder/phosphor: 1/30, by weight). Independently, a polyethylene terephthalate (PET) sheet (temporary support, thickness: 190 μm) beforehand coated with a silicone releasing agent was prepared. The above-prepared coating solution was then spread (width: 300 mm) with a coating machine on the releasing agent-coated surface of the temporary support, and dried to form a sheet containing phosphor particles. The sheet was then peeled from the temporary support, to obtain a phosphor sheet.

(3) Formation of Adhesive Layer and Light-Reflecting Layer

| | |
|---|---|
| Resin: Saturated polyester resin [MEK solution (solid content: 30 wt. %) of VYLON 300, Toyobo Co., Ltd.] | 20 g |
| Hardening agent: polyisocyanate [Orestar NP38-70s (solid content: 70 wt. %), Mitsui Toatsu Chemicals, Inc.] | 2 g |
| Electroconductive material: $SnO_2$ (doped with Sb) needle-like fine particles [major axis: 0.2 to 2 μm, minor axis: 0.01 to 0.02 μm, FS-10P MEK dispersion (solid content: 30%), Ishihara Industries Co., Ltd.] | 50 g |

The above-mentioned materials were added in 5 g of methyl ethyl ketone (MEK), and mixed and dispersed to prepare a coating solution having a viscosity of about 0.02 to 0.05 Pa·s. The coating solution was spread by means of a doctor blade and dried to coat a polyethylene terephthalate (PET) sheet (support, thickness: 188 μm, haze: approx. 27, Lumilar S-10, Toray Industries, Inc.), to to form an adhesive layer (thickness: 5 μm).

The following materials were then added in 387 g of MEK, and mixed and dispersed to prepare a coating solution having a viscosity of about 2 to 3 Pa·s. The coating solution was spread by means of a doctor blade on the adhesive layer, and dried to form a light-reflecting layer (thickness: approx. 100 μm).

| | |
|---|---|
| Light-reflecting material: Fine particles of extra-pure alumina [mean size: 0.4 μm, UA-5105, Showa Denko K.K.] | 444 g |
| Binder: Soft acrylic resin [Criscoat P-1018GS (20% toluene solution), Dai-nippon Ink & Chemicals, Inc.] | 100 g |
| Colorant: ultramarine [SM-1, Daiichi Chemical Industry Co.,, Ltd.] | 2.2 g |

(4) Formation of Phosphor Layer (Heat-Compression Treatment)

The above prepared phosphor sheet was placed on the light-reflecting layer provided on the support, so that the bottom surface (surface having been in contact with the temporary support in preparation) of the phosphor sheet would be in contact with the light-reflecting layer. Thus formed laminate was then heated and compressed using a calender machine [total load: 2,300 kg, temperature of upper roller: 45° C., temperature of lower roller: 45° C., transferring speed: 0.3 m/minute]. As a result, the phosphor layer was completely combined with the light-reflecting layer. The phosphor layer thus subjected to the heat-compression treatment had a thickness of 335 μm, and the packing density of the phosphor particles therein was 3.89 $g/cm^3$.

(5) Formation of Protective Layer

A polyethylene terephthalate film (thickness: 6 μm) having a surface coated with polyester adhesive was laminated on the phosphor layer so that the adhesive-coated surface would be in contact with the phosphor layer. The obtained laminate was hot-pressed to provide a protective layer.

Thus, a radiation image storage panel of the invention comprising a support, an adhesive layer, a light-reflecting layer, an energy-storing phosphor layer and a protective layer, arranged in order was produced.

EXAMPLE 2

The procedures of Example 1 were repeated except for the following, to produce a radiation image storage panel of the invention.

Step (1): The phosphor particles of the larger group were sieved, and then pneumatically classified to remove too large particles and too small particles. The thus-obtained large particle group had a median diameter of 7.80 μm. The particles of the smaller group were not subjected to pneumatic classification. Thus obtained small particle group had a median diameter of 2.73 μm.

Step (2): In preparing the phosphor sheet, the phosphor particles of the larger group and those of the smaller group were used in amounts of 800 g and 200 g, respectively.

Step (4): The formed energy-storing phosphor layer had a thickness of 345 μm, and the packing density of the phosphor particles therein was 3.82 g/cm³.

EXAMPLE 3

The procedures of Example 1 were repeated except for the following, to produce a radiation image storage panel of the invention.

Step (1): The phosphor particles of the larger group were sieved to remove too large particles and too small ones. Thus obtained large particle group had a median diameter of 7.95 μm. The particles of the smaller group were not subjected to pneumatic classification. Thus obtained small particle group had a median diameter of 2.74 μm.

Step (2): In preparing the phosphor sheet, the phosphor particles of the larger group and those of the smaller group were used in amounts of 800 g and 200 g, respectively.

Step (4): The formed energy-storing phosphor layer had a thickness of 345 μm, and the packing density of the phosphor particles therein was 3.78 g/cm³.

EXAMPLE 4

The procedures of Example 1 were repeated except for the following, to produce a radiation image storage panel of the invention.

Step (2): The materials were mixed and dispersed at the propeller rotation rate of 25 m/second for 2 hours, to prepare a coating solution having a viscosity of 4.0 Pa·s.

Step (4): The formed energy-storing phosphor layer had a thickness of 340 μm, and the packing density of the phosphor particles therein was 3.91 g/cm³.

COMPARISON EXAMPLE 1

The procedures of Example 1 were repeated except for the following, to produce a radiation image storage panel for comparison.

Step (1): The phosphor particles of both the larger group and the smaller group were not subjected to pneumatic classification. Thus obtained large particle group and the small particle group had median diameters of 7.86 μm and 2.76 μm, respectively.

Step (4): The formed energy-storing phosphor layer had a thickness of 340 μm, and the packing density of the phosphor particles therein was 3.72 g/cm³.

Evaluation of Radiation Image Storage Panel

With respect to each produced radiation image storage panel, the size frequency distribution of phosphor particles and the quality of reproduced image were evaluated in the following manner.

(1) Size Frequency Distribution

The phosphor layer was separated from the storage panel, and heated at 500° C. to burn off materials other than the phosphor. The remaining phosphor was added into an electrolytic solution (methanol containing lithium chloride dissolved therein), and fully dispersed for 1 minute in an ultrasonic cleaner. The phosphor particles dispersed in the solution were then counted by means of a Coulter counter, to obtain the size frequency distribution. Each size class of the size frequency distribution was determined so that the range of the class would be 1.2 times as large as that of the neighboring smaller class and thereby so that the range of each class would have the same width in logarithmic scale. From thus measured size frequency distribution, the size frequencies a and b at the median diameters $Dm_a$ and $Dm_b$, respectively, and the lowest size frequency c positioned between them were obtained.

(2) Image Quality

The surface of the storage panel was evenly exposed to X-rays (0.1 mR, tube voltage: 80 kVp, emitted from a tungsten tube), to measure a Wiener spectrum of granularity. From the obtained value, the detective quantum efficiency (DQE) at the spatial frequency of 1 cycle/mm was estimated. Since the granularity depends on the dose of X-rays, the applied dose was monitored to normalize the measured granularity into a value on the dose of 0.1 mR.

Figure 3:
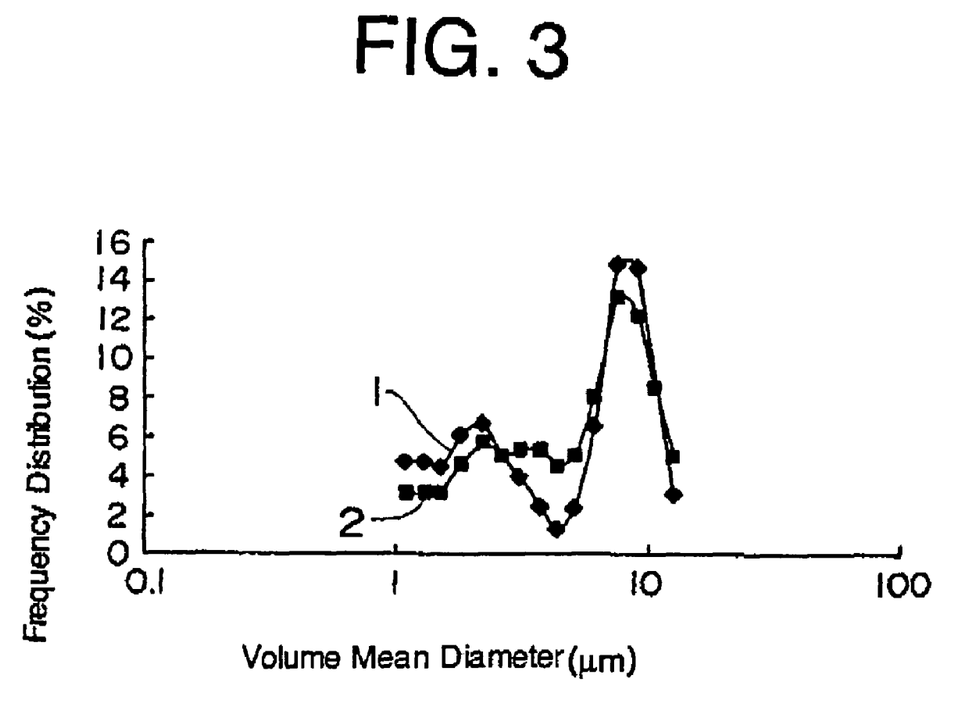
FIG. 3 is a graph showing size frequency distributions of energy-storing phosphor particles in Example 1 and Comparison Example 1.
Figure 4:
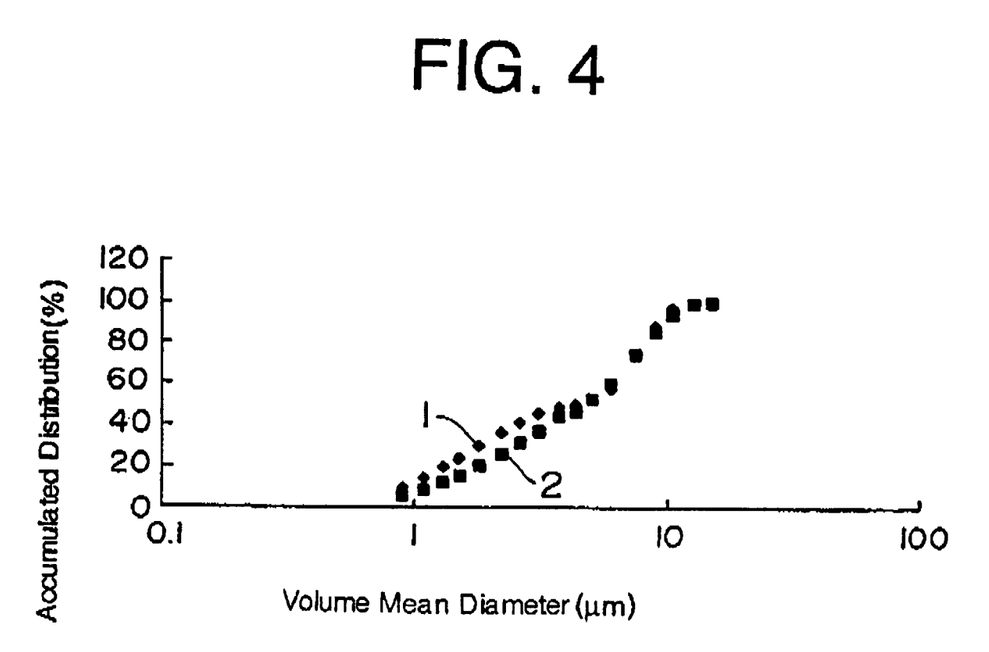
FIG. 4 is a graph showing a relationship between the volume mean diameter (μm) and the accumulated distribution (%) with respect to the phosphor particles in Example 1 or Comparison Example 1.

The results are set forth in Table 1 and FIGS. 3 and 4.

TABLE 1

| | Phosphor particles | | | | | | | |
|---|---|---|---|---|---|---|---|---|
| | Median diameter | | | | Distribution (%) | | | |
| Ex. | $Dm_a$ | $Dm_b$ (μm) | Ratio A/B | a | b | (a + b)/5 | (a + b)/7 | c |
| Ex. 1 | 7.93 | 2.76 | 7/3 | 15 | 6.7 | 4.3 | 3.1 | 1.3 |
| Ex. 2 | 7.80 | 2.73 | 8/2 | 16 | 4.5 | 4.2 | 3.0 | 3.5 |
| Ex. 3 | 7.95 | 2.74 | 8/2 | 15 | 4.8 | 4.0 | 2.8 | 3.5 |
| Ex. 4 | 7.93 | 2.76 | 7/3 | 15 | 7.2 | 4.4 | 3.2 | 1.8 |
| Com. 1 | 7.86 | 2.76 | 7/3 | 13.3 | 5.7 | 3.8 | 2.7 | 4.6 |

| | Phosphor layer | | |
|---|---|---|---|
| Ex. | Thickness | Packing density | DQE |
| Ex. 1 | 335 μm | 3.89 g/cm³ | 25.4% |
| Ex. 2 | 345 μm | 3.82 g/cm³ | 25.2% |
| Ex. 3 | 345 μm | 3.78 g/cm³ | 24.9% |
| Ex. 4 | 340 μm | 3.91 g/cm³ | 25.8% |
| Com. Ex. 1 | 340 μm | 3.72 g/cm³ | 24.3% |

FIG. 3 is a graph showing size frequency distributions of energy-storing phosphor particles in Example 1 and Comparison Example 1. The curves 1 and 2 indicate the distributions in example 1 and Comparison Example 1, respectively.

FIG. 4 is a graph showing a relationship between the volume mean diameter (μm) and the accumulated distribution (%) with respect to the phosphor particles in Example 1 or Comparison Example 1. The marks ♦ and ■ indicate the relations in Example 1 and Comparison Example 1, respectively.

As shown in FIG. 3, the size frequency distribution of phosphor particles in the storage panel of the invention (Example 1) had the lowest frequency between the peaks of the large and small particle groups A and B. In contrast, the distribution of phosphor particles in the storage panel for comparison (Comparison Example 1) did not have the lowest frequency between the peaks.

The results shown in Table 1 clearly indicate that each storage panel of the invention (Examples 1 to 4), in which the phosphor particles had a size frequency distribution satisfying the condition of $(x+y)/5>z$, had a more closely packed phosphor layer and accordingly gave a radiation image more improved in graininess (DQE) than the storage panel for comparison (Comparison Example 1), in which the phosphor particles did not satisfy the above distribution condition. Further, each of the storage panels of Examples 1 and 4, in which the phosphor particles satisfied the condition of $(x+y)/7>z$, had a particularly closely packed phosphor layer and accordingly gave a radiation image remarkably improved in graininess (DQE).

What is claimed is:

1. A radiation image storage panel which has a phosphor layer containing energy-storing phosphor particles, wherein the energy-storing phosphor particles comprises a mixture of a phosphor particle group having a relatively large median diameter and a phosphor particle group having a relatively small median diameter, the former group having a median diameter in the range of 4 to 30 μm, the latter group having a median diameter in the range of 1 to 8 μm, and the mixture of these groups having a particle size frequency distribution that satisfies the condition of:

$$(x+y)/5>z$$

in which x is a size frequency in terms of percent at the peak in a larger range of the size frequency distribution curve, y is a size frequency in terms of percent at the peak in a smaller range, and z is the lowest size frequency in terms of percent in the range between the two peaks.

2. The radiation image storage panel of claim 1, wherein the particle size frequency distribution of the energy-storing phosphor particles satisfies the condition of:

$$(x+y)/7>z$$

in which x, y and z are the same as those defined above.

3. The radiation image storage panel of claim 1, wherein the phosphor particle group having a relatively large median diameter has a median diameter in the range of 6 to 15 μm, and the phosphor particle group having a relatively small median diameter has a median diameter in the range of 2 to 4 μm.

4. The radiation image storage panel of claim 1, wherein the phosphor layer has a thickness in the range of 300 to 500 μm.

* * * * *